United States Patent [19]

Kolouch et al.

[11] 4,409,167

[45] Oct. 11, 1983

[54] PROCESS FOR EXTRUDING A MODIFIED HIGH MOLECULAR WEIGHT POLY(ETHYLENE TEREPHTHALATE) RESIN

[75] Inventors: Robert J. Kolouch, Vienna, W. Va.; Rudolph H. Michel, Wilmington, Del.

[73] Assignee: E. I. Du Pont de Nemours & Co., Wilmington, Del.

[21] Appl. No.: 332,768

[22] Filed: Dec. 21, 1981

Related U.S. Application Data

[63] Continuation-in-part of Ser. No. 224,673, Jan. 13, 1981, abandoned.

[51] Int. Cl.³ .............................................. B29B 1/10
[52] U.S. Cl. .............................. 264/102; 264/176 R; 264/210.7; 264/211; 264/349; 425/203; 525/437; 528/309.1
[58] Field of Search ............... 264/176 R, 211, 210.7, 264/349, 102, 101; 528/309, 309.1; 525/437; 425/203

[56] References Cited

U.S. PATENT DOCUMENTS

| | | | |
|---|---|---|---|
| 3,553,157 | 1/1971 | Dijkstra et al. | 260/40 R |
| 3,963,678 | 6/1976 | Conrad et al. | 264/210.7 |
| 3,963,679 | 6/1976 | Ullrich et al. | 264/211 |
| 4,022,752 | 5/1977 | Horn et al. | 525/437 |
| 4,022,863 | 5/1977 | Karass et al. | 264/210.7 |
| 4,055,534 | 10/1977 | Gerber | 525/437 |
| 4,065,532 | 12/1977 | Wild et al. | 264/211 |
| 4,178,277 | 12/1979 | Gebauer et al. | 260/40 R |
| 4,245,081 | 1/1981 | Quiring et al. | 264/176 R |
| 4,260,690 | 4/1981 | Binsack et al. | 260/40 R |
| 4,261,946 | 4/1981 | Goyert et al. | 264/211 |

Primary Examiner—Jeffery R. Thurlow

[57] ABSTRACT

Poly(ethylene terephthalate) resin and blends of poly(ethylene terephthalate) resin with other polymers are extruded while being coupled with an organic diisocyanate under conditions where carbon dioxide gas is vented smoothly, as it is formed. The extruder has a number of zones designed to perform specific functions. The temperature in the kneading zone and in the venting zone must be maintained at about 280°–320° C. to bring about rapid reaction and to permit efficient gas evolution and removal without thermally degrading the polymeric material. The extruded article is free of trapped gas bubbles and other imperfections. This process is particularly suitable for making PET billets, which then are stretched to form strapping useful in packaging applications.

13 Claims, 2 Drawing Figures

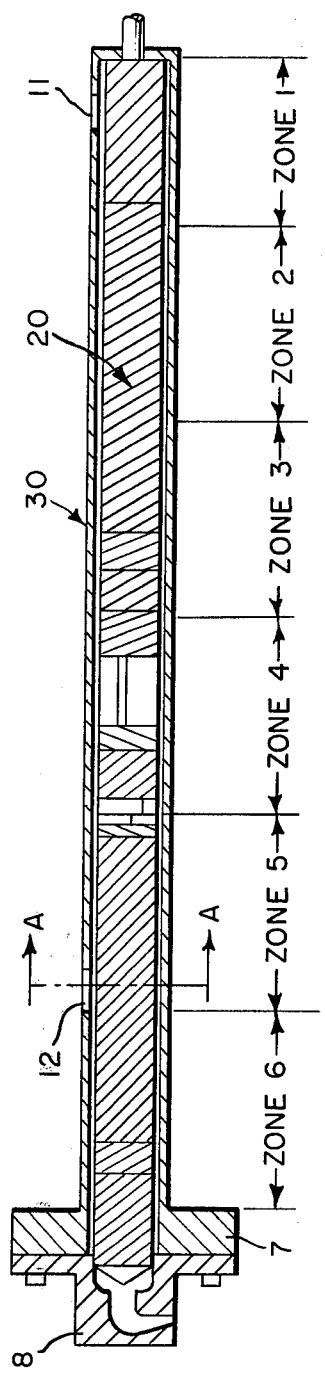
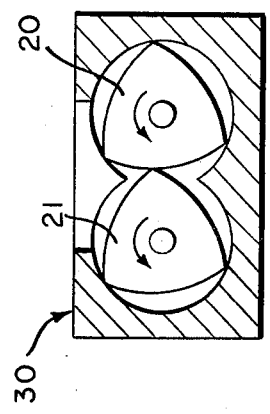
FIG. 1
FIG. 2

PROCESS FOR EXTRUDING A MODIFIED HIGH MOLECULAR WEIGHT POLY(ETHYLENE TEREPHTHALATE) RESIN

This is a continuation-in-part of application Ser. No. 224,673 filed Jan. 13, 1981 now abandoned.

BACKGROUND OF THE INVENTION

Poly(ethylene terephthalate), sometimes abbreviated to PET throughout this disclosure, has many industrial uses, including the manufacture of fibers, films, and shaped articles. PET resins having a low to moderate molecular weight, $M_n = 12,000-16,000$, are easy to fabricate in all types of equipment. Higher molecular weight resins, for example, those having $M_n$ of about 25,000-45,000, are more difficult to extrude because more energy is required to move the viscous melt throughout the equipment.

A known expedient, that has been used in the past, is to increase the molecular weight of polyester resins directly in the fabricating equipment, for example, by coupling with an organic diisocyanate and crosslinking. Since, however, at the normal PET melt processing temperatures of about 265°–270° C. the intermediate —COOCONH— group formed by reaction of the isocyanate with the terminal carboxyl groups of the poly(ethylene terephthalate) decomposes with carbon dioxide evolution, the polymer is likely to contain trapped gas bubbles. This naturally is undesirable where a homogeneous and strong material is required. A practical method of extruding various shapes from high molecular weight PET thus is needed.

SUMMARY OF THE INVENTION

According to this invention, there is provided a process for extruding a polymeric composition selected from the class consisting of (a) poly(ethylene terephthalate) resin;

(b) a uniform blend of poly(ethylene terephthalate) resin with a compatible polymer, the amount of the compatible polymer being at most about 10 weight percent of the blend; and (c) a uniform blend of a poly(ethylene terephthalate) resin with an incompatible polymer and a compatibilizing agent, the total amount of the incompatible polymer and compatibilizing agent being at most about 20 weight percent of the blend;

said process comprising:

(1) Premixing an organic diisocyanate with said polymeric composition or individual components of said composition, in any order, the amount of said diisocyanate being sufficient to increase the melt viscosity of said polymeric composition to the desired level without causing excessive crosslinking;

(2) introducing the premix of step (1) into the feed section of a twin-screw extruder having a cold feed section, a hot plastication zone, a kneading zone maintained at an average temperature of about 280° to 320° C., a venting zone maintained at an average temperature of about 280° to 320° C. and at a reduced pressure (preferably less than 1.33 kPa), a metering zone maintained at an average temperature of about 260° to 280° C., and an extrusion die maintained at an average temperature of about 255° to 265° C., all the temperatures being wall temperatures; and (3) operating the extruder at about 30-120 rpm and at a pressure of about 350 kPa or less to recover the extruded article from the die.

BRIEF DESCRIPTION OF THE DRAWINGS

The drawings represent a commercial twin-screw extruder which can be used in the process of this invention.

FIG. 1 is a schematic side view and FIG. 2 is a cross-sectional view through plane A—A of FIG. 1.

DETAILED DESCRIPTION OF THE INVENTION

The starting PET resin is commercially available from Goodyear Tire and Rubber Company, Amoco Corporation, and Hoechst. The preferred PET resin has an inherent viscosity $\eta_{inh}$ of about 0.7 dl/g, as determined in a solution of 0.5 g of poly(ethylene terephthalate) in 100 cm³ of a 3:1 w/w mixture of trifluoroacetic acid and methylene chloride at 30° C. An $\eta_{inh}$ of 0.72 dl/g corresponds to a number average molecular weight, $M_n$ of 16,000, while an $\eta_{inh}$ of 1.00 dl/g corresponds to $M_n$ of 28,000. Low carboxyl group content, less than about 30 milliequivalents per gram, preferably less than 20 meq/g, is advantageous. For this reason, virgin poly(ethylene terephthalate) is preferred to recycled resin, which normally has a higher carboxyl group content.

Commercial PET always contains some diethylene glycol ester because some diethylene glycol is formed from ethylene glycol under the esterification conditions. The PET resin best suited in this process should contain at most 5 mole % of diethylene glycol component, preferably less than 2 mole %. Naturally, the starting resin should also contain as little water as possible because water would react with the diisocyanate in competition with the resin's —OH and 'COOH groups.

Blends of PET with other compatible polymers often are preferred to PET alone because of their increased toughness and reduced tendency to fibrillate. The preferred proportion of such additional polymer is about 4-6% based on the total weight of the blend. Usually, at least 3% of such other polymer is required for noticeable improvement of the extrudate properties. The polymer should be temperature-resistant and preferably should contain no carboxyl groups or a low concentration of carboxyl groups. Suitable polymers for blending with the PET resin include, for example, EPDM elastomer grafted with maleic anhydride or with maleic or fumaric acid or their esters and their blends with ungrafted EPDM elastomers. EPDM elastomers are well known to the art and are obtained by copolymerization of ethylene, propylene, and a diene having only one polymerizable double bond. Optionally, they may also contain a minor amount of a diene having two polymerizable double bonds. Grafting of maleic anhydride, maleic acid, fumaric acid, and their esters such as for example mono and diethyl fumarate and mono and dimethyl maleate onto EPDM elastomers has been described in Caywood's U.S. Pat. Nos. 3,884,882 and 4,010,223. Other suitable polymers that can be blended with the PET resin include copolymers of ethylene with acrylic esters and/or acrylic or methacrylic acids and their salts, as well as their blends with hydrocarbon polymers, for example, ethylene/propylene copolymers. The carboyxl- or ester-containing polymers are compatible with the PET resin. They also act as compatibilizing agents for other polymers which are not compatible with the PET resin by themselves, for example, EPDM elastomers or other hydrocarbon polymers.

Since the presence of additional carboxyl groups in some of these polymers to some extent compounds the difficulty because of additional carbon dioxide generation, it is necessary when carboxylated polymers are used in the blends to adjust the operating conditions to be able to remove all of the gas in the venting zone. This may require a higher vacuum or a slower operation at a lower throughput.

The organic diisocyanate can be any diisocyanate that can be obtained commercially at a reasonable price, whether aromatic, aliphatic, or cycloaliphatic. Representative aromatic diisocyanates include various isomeric forms of toluene diisocyanate, methylenebis(p-phenyl isocyanate), and isocyanate-terminated biurets known to the art. Aliphatic and cycloaliphatic diisocyanates include, for example, cyclohexanediisocyanate, methylenebis(4-cyclohexyl isocyanate), hexamethylene diisocyanate, and the so-called isophorone diisocyanate which is properly named 1-isocyanato-2-isocyanatomethyl-3,5,5-trimethylcyclohexane.

As a rule, aliphatic diisocyanates are less reactive and potentially more toxic than aromatic. On the other hand, they do not impart undesirable coloration to the extruded material. Aromatic diisocyanates do produce a yellow tinge or color, but this does not detract from their use in many applications, for example, in industrial strapping. The preferred diisocyanate is methylenebis(p-phenyl isocyanate), also known as MDI. It is solid at normal temperature and therefore can be conveniently blended in dry state with the PET resin. Those diisocyanates which are liquid at room temperature may require a longer or more thorough mixing to assure a good, uniform distribution of the liquid throughout the resin.

The amount of diisocyanate depends, among others, on the initial melt viscosity, $\eta_{inh}$, of the PET resin and its carboxyl group content as well as on the desired molecular weight of the diisocyanate-coupled resin. For normal extrusion grade PET resins and their blends, MDI is used in an amount of about 0.6–1.1% based on the weight of the PET resin, preferably, 0.7–1%, and especially 0.8–0.9%. Larger amounts may cause undesirable excessive crosslinking by secondary reaction with urethane groups. Smaller amounts may not produce sufficient molecular weight increase. Naturally, more diisocyanate is needed when a lower $\eta_{inh}$ PET resin is used than when a higher $\eta_{inh}$ resin is used. The amounts of diisocyanates other than MDI depend on their reactivity with hydroxyl or carboxyl end groups. Aliphatic diisocyanates, which are less reactive, are used in proportionately higher amounts, while more reactive diisocyanates would be used in proportionately lower amounts. Reactivity of an isocyanate with hydroxyl or carboxyl end groups can be readily ascertained by known methods.

Premixing of the diisocyanate with PET resin, a blend, or individual components of a blend can be carried out at any convenient temperature below the temperature at which substantial reaction of the isocyanate groups with the active hydrogen groups of PET resin would take place. Preferably, premixing is done below the melting point of the diisocyanate, and most frequently below about 120° C.

A typical twin-screw extruder is shown in the drawings. As shown schematically in FIG. 1, the extruder is divided into six main zones; from right to left: feed zone 1, heating zone 2, plastication zone 3, kneading zone 4, venting zone 5, and metering zone 6, which ends with flange 7 and is followed by extrusion die 8. The particular model shown in the drawings is a Werner-Pfleiderer twin screw extruder Model ZDS K28, wherein the screws are intermeshing, self-wiping, and co-rotating. Modular screw elements permit the screws to be assembled in the proper configuration for optimum process conditions. Thus, the screws have sections of different pitch and different length, both right-hand and left-hand, and kneading blocks. While all the major functions are performed in screw sections having right-hand flights, the left-hand flight sections assure adequate residence times in the kneading blocks. Zone 1 is equipped with feed port 11 and zone 5 with vent port 12. The screw arrangement and the temperature distribution within the extruder are shown in the table below:

TABLE

| | Temperature, °C. | Pitch (mm)/length (mm) |
|---|---|---|
| Zone 1 | Ambient | 45/90 feed port |
| | | 30/14 |
| Zone 2 | 160 | 30/126 |
| Zone 3 | 250 | 30/70 |
| | | 24/24 |
| | | 30/30 |
| | | 24/2 |
| Zone 4 | 300 | 24/22 |
| | | KB* 5/45 |
| | | 24/16 LH** |
| | | 15/30 |
| | | KB* 3/13 |
| Zone 5 | 300 | KB* 3/7 |
| | | 24/8 LH** |
| | | 45/111 includes vent port |
| Zone 6 | 270–280 | 45/84 |
| | | 30/20 |
| | | 15/22 |
| Flange 7 | | 15/28 |
| Die 8 | 255–265 | 15/10 |
| | | —/16 tip |

*Kneading block
**Left-hand screw flights

Preferably, the temperature range in Zones 4 and 5 is about 290°–310° C. Within this range, adequate reaction and venting rates are maintained, and excessive thermal degradation is avoided. The extruded article is free of gas bubbles or other imperfections. It is important that the vent port, and thus Zone 5, be maintained at the highest practical vacuum since otherwise the removal of gas bubbles will be unsatisfactory.

A cross-section through A—A (vent port 12) is shown schematically in FIG. 2. The screw cross-sections 20 and 21 appear triangular because each screw has three flights, which are designed so that they wipe each other and the barrel 30. Although theoretically a single-screw extruder can be used, it has been found that such a machine is much more difficult to degas and would be of questionable utility in an industrial operation. The overall design of the extruder should be such that degassing through vent 12 takes place as far downstream as possible, and the metering zone 6 should be as short as practical. However, the temperatures in the metering zone as well as in the die should always be lower than in the degassing zone. The die design should be such that it would give minimum hold-up. Degassing naturally is better at lower throughput rates. A practical feed rate for the extruder illustrated in the drawing was found to be about one-half of the internal volume of the machine per hour. This amounted for this particular model to about 2.5–4.5 Kg/hr.

The process of this invention is particularly suitable for extruding high molecular weight PET billets to be used for making strapping for packaging applications such as, for example, holding boxes and bags on pallets.

This invention is illustrated by the following examples of certain preferred embodiments thereof, where all parts, proportions, and percentages are by weight.

EXAMPLE 1

PET resin having $\eta_{inh}$=0.70–0.74 dl/g was granulated at dry ice temperature, then dried in 3000 g batches in metal paint cans at 135° C. The cans were sealed hot and cooled to room temperature. MDI was powdered, and 25.5 g of this material (0.85% based on the weight of the PET resin) was added to each can under nitrogen The cans were tumbled for 30 minutes. The blend was fed under a nitrogen blanket into a hopper by means of a twin-screw feeder made by K-Tron Corporation at a rate of 4.5 kg/hr and was delivered by gravity from the hopper into a 28 mm Werner-Pfleiderer extruder (illustrated in the drawing). The screw configuration was as shown in the above Table. The low hold-up die arrangement had a melt path length of about 8.9 cm. The melt pressure within the extruder was about 180–700 KPa and the temperature distribution was that given in the above Table. Vent port 12 (FIG. 1) was maintained at a pressure of about 0.1–0.13 kPa. The screws were rotated at 40 rpm.

The extruded continuous billet (cross-section 2.5×0.15 cm) was quenched on a water-cooled drum and wound up. It was free of gas bubbles and had an $\eta_{inh}$=1.02–1.08 dl/g.

EXAMPLE 2

A concentrate was prepared by melt blending 86 parts of poly(ethylene terephthalate) having an $\eta_{inh}$=0.70–0.74 dl/g with 9 parts of an ethylene/propylene/1,3,5-hexatriene copolymer and 5 parts of an ethylene/propylene/1,3,5-hexatriene copolymer grafted with 1.8% of fumaric acid. This blend was granulated and mixed in a 1:2 ratio with the above PET resin. MDI, 0.9 part, was added to the resulting polymer mixture and the mixture was extruded as in Example 1. The product was bubble-free; its $\eta_{inh}$ was 0.97–1.00 dl/g.

EXAMPLE 3

An extruded continuous billet of cross-section 2.5×0.15 cm and $\eta_{inh}$=0.92–1.02 dl/g was prepared as described in Example 1 except that the throughput was 2.5 kg/hr; the isocyanate concentration was 0.8%; and the die channel was about 23 cm long. A portion of this slightly curved billet was flattened between rolls at room temperature without change in dimensions. The flattened billet was then oriented in two stages using a short-gap, tangential roll stretcher supplied by Marshall and Williams Co. by first stretching it 4 times at 89° C. and then stretching it again about 1.3 times at 180° C. to 185° C. The strap so obtained had a cross-section of about 1.3×0.05 cm and was found to have a tensile strength of 655 MPa by ASTM test D638 modified in that the measurement was made on the strap as made using a 25.4 cm gauge length and pulling at 5.1 cm/min. The split resistance of the strap was determined using an apparatus with a pneumatically driven, controlled penetrating probe with a 30° conical tip which completely penetrates a firmly held sample of strap at a rate of 2.5 cm/sec. A sample is considered to have failed if cracks are found to have been propagated from the point of penetration. The oriented strap of this example was found to have one failure in 32 penetrations. Strap of polyethylene terephthalate from the uncoupled PET having $\eta_{inh}$=0.74 dl/g and drawn to produce maximum tensile strength will fail on each penetration in this test.

EXAMPLE 4

An extruded continuous billet of cross-section 2.5×0.15 cm and $\eta_{inh}$=0.87–1.05 dl/g prepared as described in Example 2, except that the throughput was 2.7 kg/hr and the die channel was about 23 cm long, was converted to strap and tested in 23 penetrations as outlined in Example 3. This strap was found to have a tensile strength of 636 MPa and did not exhibit splitting after any of the penetrations.

We claim:

1. A process for extruding a bubble-free article from a polymeric composition selected from the class consisting of:
 (a) poly(ethylene terephthalate) resin;
 (b) a uniform blend of poly(ethylene terephthalate) resin with a compatible polymer, the amount of the compatible polymer being at most about 10 weight percent of the blend; and
 (c) a uniform blend of a poly(ethylene terephthalate) resin with an incompatible polymer and a compatibilizing agent, the total amount of the incompatible polymer and compatibilizing agent being at most about 20 weight percent of the blend;
 said process comprising:
 (1) premixing an organic diisocyanate with said polymeric composition or individual components of said composition, in any order, the amount of said diisocyanate being sufficient to increase the melt viscosity of said polymeric composition to the desired level without causing excessive crosslinking;
 (2) introducing the premix of step (1) into the feed section of a twin-screw extruder having a cold feed section, a hot plastication zone, a kneading zone maintained at an average temperature of about 280° to 320° C., a venting zone maintained at an average temperature of about 280° to 320° C. and at a pressure of less than about 1.33 kPa, a metering zone maintained at an average temperature of about 260° to 280° C., and an extrusion due maintained at an average temperature of about 255° to 265° C., all the temperatures being wall temperatures; and
 (3) operating the extruder at about 30–120 rpm and at a pressure of about 350 kPa or less to recover the extruded article from the die.

2. A process of claim 1 wherein the diisocyanate is methylenebis(p-phenyl isocyanate).

3. A process of claim 2 wherein the polymeric composition is poly(ethylene terephthalate).

4. A process of claim 1 wherein the polymeric composition is a blend of poly(ethylene terephthalate) with an EPDM elastomer grafted with an unsaturated compound selected from the class consisting of maleic anhydride, maleic acid, fumaric acid, and mono- and diesters of maleic and fumaric acids.

5. A process of claim 4 wherein the grafted EPDM elastomer is present in the amount of 4–6% of the total weight of the blend.

6. A process of claim 1 wherein the polymeric composition is a blend of poly(ethylene terephthalate) with a compatible polymer, which is present in an amount of at least 3% of the total weight of the blend.

7. A process of claim 2 wherein the amount of the diisocyanate is about 0.6–1.1% based on the weight of poly(ethylene terephthalate) resin.

8. A process of claim 7 wherein the amount of diisocyanate is 0.7–1% based on the weight of poly(ethylene terephalate) resin.

9. A process of claim 8 wherein the amount of diisocyanate is 0.8–0.9% based on the weight of poly(ethylene terephthalate) resin.

10. A process of claim 1 wherein the average temperature range within the kneading zone and within the venting zone is about 290°–310° C.

11. A process of claim 10 wherein the vent port is maintained at a pressure of about 0.1–0.13 kPa.

12. A process of claim 10 wherein the average temperature range within the metering zone is about 270°–280° C.

13. A process of claim 10 wherein the feed rate is about one-half of the internal volume per hour.

* * * * *